United States Patent

Kato

[11] Patent Number: 5,159,745
[45] Date of Patent: Nov. 3, 1992

[54] ROBOTIC APPARATUS AND METHOD FOR AUTOMOBILE ASSEMBLY

[75] Inventor: Hisao Kato, Inazawa City, Japan

[73] Assignee: Mitsubishi Denki Kabushiki Kaisha, Tokyo, Japan

[21] Appl. No.: 492,855

[22] Filed: Mar. 13, 1990

[30] Foreign Application Priority Data

Mar. 29, 1989 [JP] Japan .................. 1-76983

[51] Int. Cl.$^5$ ............................................ B23Q 17/00
[52] U.S. Cl. .................................. 29/407; 29/430; 29/709; 29/711; 29/791; 29/795; 901/6; 901/47
[58] Field of Search ............... 29/407, 420, 430, 709, 29/711, 791, 802, 720; 901/6, 46, 47; 414/222, 225; 364/513

[56] References Cited

U.S. PATENT DOCUMENTS

| | | | |
|---|---|---|---|
| 4,044,377 | 8/1977 | Bowermann | 358/107 |
| 4,146,924 | 3/1979 | Birk et al. | 364/513 |
| 4,170,891 | 10/1979 | Elsner | 73/1 |
| 4,187,051 | 2/1980 | Kirsch et al. | 414/744 |
| 4,219,847 | 8/1980 | Pinkney et al. | 358/126 |
| 4,295,740 | 10/1981 | Sturges | 356/152 |
| 4,344,146 | 8/1982 | Davis et al. | 364/552 |
| 4,373,804 | 2/1983 | Pryor et al. | 356/1 |
| 4,380,696 | 4/1983 | Masaki | 219/124 |
| 4,907,169 | 3/1990 | Lovoi | 901/47 X |

FOREIGN PATENT DOCUMENTS

| | | | |
|---|---|---|---|
| 63-282577 | 11/1988 | Japan . | |
| 1-45288 | 6/1989 | Japan | 29/802 |
| 2204840 | 11/1988 | United Kingdom | 29/802 |

OTHER PUBLICATIONS

Hideshi et al., "Real Time Image Processor Using Area Image Sensor (Part 3)", 1986, Omron Technics Digest, pp. 57–64.

Primary Examiner—Joseph M. Gorski
Assistant Examiner—S. Thomas Hughes
Attorney, Agent, or Firm—Leydig, Voit & Mayer

[57] ABSTRACT

A robotic apparatus for automobile assembly includes a robot which moves in sequence to a plurality of different stations and performs an operation at each station based on information obtained from a video camera. The camera can pivot to form an image of each station. While the robot is performing an operation at one station, the camera is forming an image at a subsequent station. By the time that the robot finishes the operation at one station and moves to the subsequent station, the image formed by the camera at the next station has already been processed by a controller, and the robot can immediately begin to perform an operation at the subsequent station.

17 Claims, 4 Drawing Sheets

ROBOTIC APPARATUS AND METHOD FOR AUTOMOBILE ASSEMBLY

BACKGROUND OF THE INVENTION

This invention relates to a robotic apparatus for the assembly of automobiles and to an assembly method employing this apparatus. More particularly but not exclusively, it relates to a robotic apparatus and method for mounting wheels on automobile bodies.

Industrial robots have come to be extensively used in the manufacture of automobiles. Early industrial robots employed complicated electromechanical devices for controlling the motions of the robot. More modern robots employ a video camera to form an image of the positions and orientations of objects to be manipulated by the robot, and the movements of the robot are controlled in accordance with the video image.

Typically, the video camera is mounted atop the robot and is aimed at the object which is to be manipulated by the robot. A computer processes the video image formed by the camera, performs recognition of the objects in the processed image, and then controls the movement of the robot so as to manipulate the object. Frequently, a robot must move between several work stations and transfer objects between the stations. For example, a robot for mounting wheels on automobile bodies must move between a wheel conveyor, where the robot grasps a wheel, and a vehicle body, where the robot mounts the wheel on a brake drum of the vehicle. At each station, optical recognition must be performed before the robot can pick up or mount a wheel. Since the video camera is mounted atop the robot, the optical recognition can begin only after the robot has pivoted to a station where it is to perform a task. The robot must then sit idle at this station until image processing, which may take a substantial length of time, is completed. Thus, in the operation of a conventional robotic assembly apparatus, there is much wasted time in which the robot is not performing any task but is simply waiting for image processing to be performed.

SUMMARY OF THE INVENTION

It is an object of the present invention to provide a robotic assembly apparatus which can reduce the percentage of time for which the robot is idle.

It is another object of the present invention to provide a robotic assembly apparatus which can be used to automatically mount wheels on automobile bodies.

It is still another object of the present invention to provide an efficient robotic assembly method.

An assembly apparatus according to the present invention includes a robot which can move in sequence to a plurality of discrete fixed stations and perform an operation on an object at each station based on instructions from a controller. While the robot is performing an operation on an object at one station, a position recognition means recognizes the position of an object on which an operation is to be performed by the robot at a subsequent station and generates positional information. By the time that the robot finishes the operation at one station and moves to the subsequent station, the recognition at the next station has already been completed, and the robot can immediately begin to perform an operation on an object at the subsequent station.

Typically, the position recognition means is in the form of a video camera which forms an image of an object. The video image is processed by an image processor to obtain positional information concerning the object. The movement of the robot is then controlled by a robot controller based on the positional information.

The present invention is particularly suited but not limited to use in the manufacture of automobiles. In a preferred embodiment, the apparatus is a wheel mounting apparatus which automatically mounts wheels on vehicle bodies.

In connection with automotive assembly, "station" is used to mean a work station along an automobile assembly line. However, more generally, station is used to refer to the location of an object on which the robot performs an operation.

There is no limit on the number of stations at which the robot performs operations. In a preferred embodiment, there are two stations: a supply station at which the robot picks up an object, and a mounting station at which the robot mounts the object on a vehicle body.

An assembly apparatus according to the present invention can be used for many different types of assembly operations, and the particular operation which is performed by the robot at each station will depend on the capabilities of the particular robot which is employed. The robot need not be of any particular type. In a preferred embodiment, the robot is one capable of grasping and manipulating wheels and mounting them on vehicle bodies.

The present invention may also include a supply means for supplying objects to be operated on by the robot to the supply station.

An assembly method according to the present invention comprises generating positional information concerning an object at a first station, moving a robot to the first station and controlling the robot to perform an operation on an object at the first station based on the positional information, and generating positional information concerning an object at a second station while the robot is performing an operation at the first station.

DESCRIPTION OF THE PREFERRED EMBODIMENT

Figure 1:
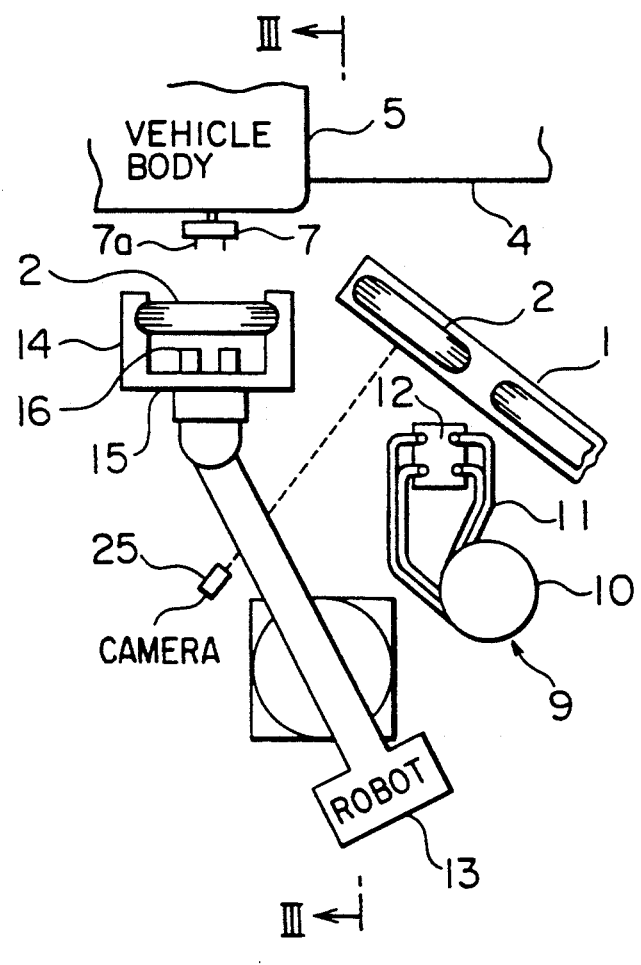
FIG. 1 is a plan view of an embodiment of a robotic assembly apparatus according to the present invention, showing a robot when mounting a wheel on a vehicle body.
Figure 2:
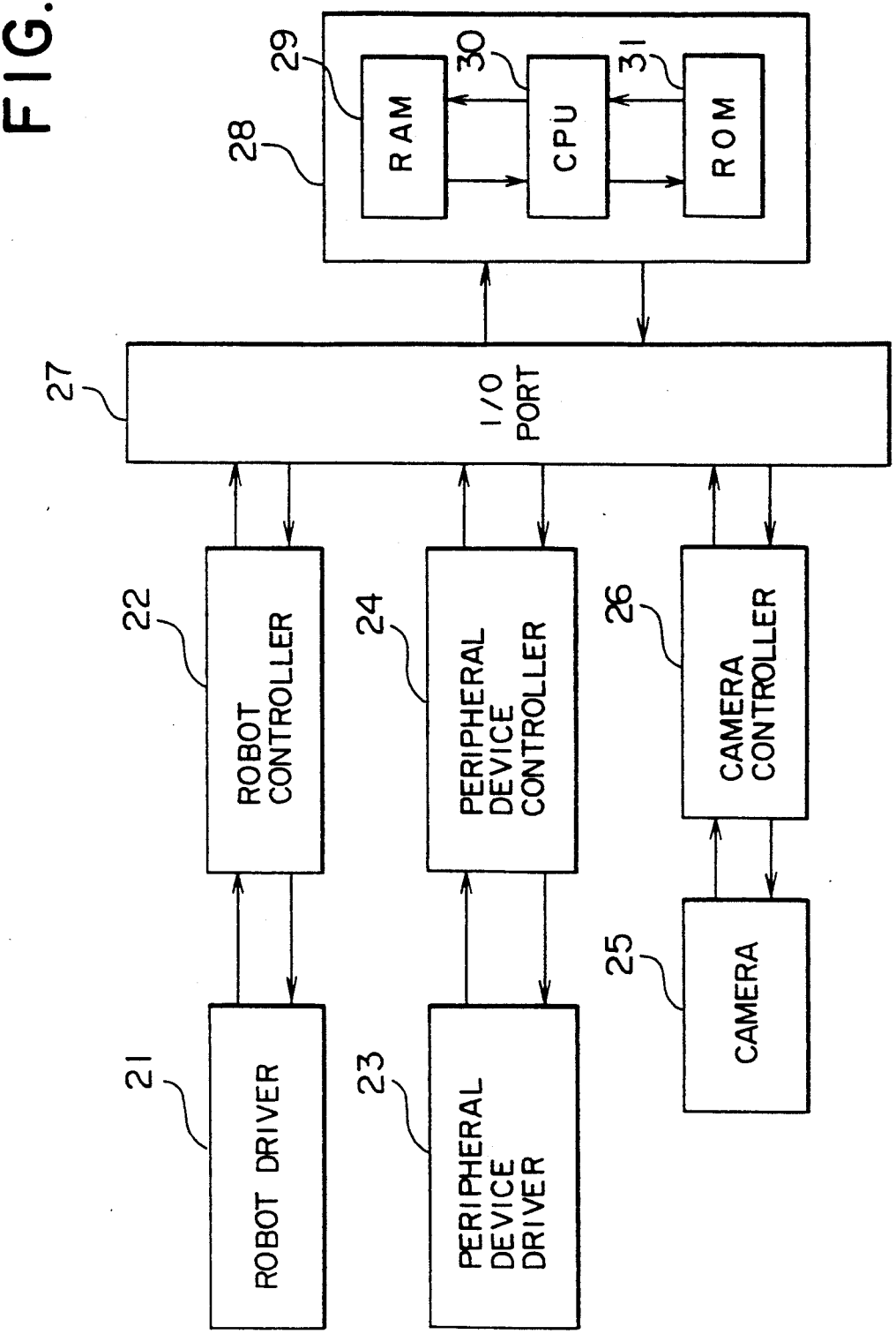
FIG. 2 is a block diagram of an embodiment of a control circuit for a robotic apparatus according to the present invention.
Figure 3:
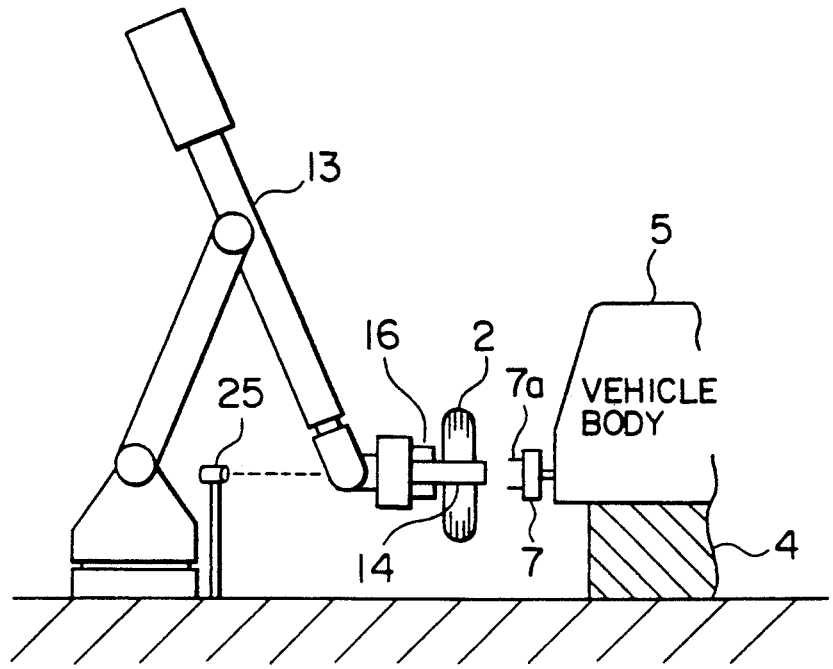
FIG. 3 is an elevation taken along Line III—III of FIG. 1.

A preferred embodiment of a robotic apparatus and assembly method according to the present invention will now be described while referring to the accompanying drawings. FIG. 1 is a plan view of the mechanical portions of this embodiment, and FIG. 2 is a block diagram of a control circuit for this embodiment. The present embodiment is an apparatus for mounting wheels on a vehicle body. It includes an industrial robot 13 which is pivotably mounted on a base. The robot 13 is equipped with an arm having a hand 15 mounted on its end. The hand 15 includes claws 14 which can be opened and closed to grasp a wheel and tire assembly, i.e. a wheel and a tire which is mounted on the wheel. This assembly will be referred to simply as a wheel 2. The hand 15 is also equipped with a plurality of nut runners 16 equal to the number of stud holes in the wheel 2. The nut runners 16 can move back and forth with respect to the hand 15 and can rotate to drive unillustrated wheel mounting nuts. The attitude of the hand 15 with respect to the arm of the robot 13 can be freely controlled.

Figure 4:
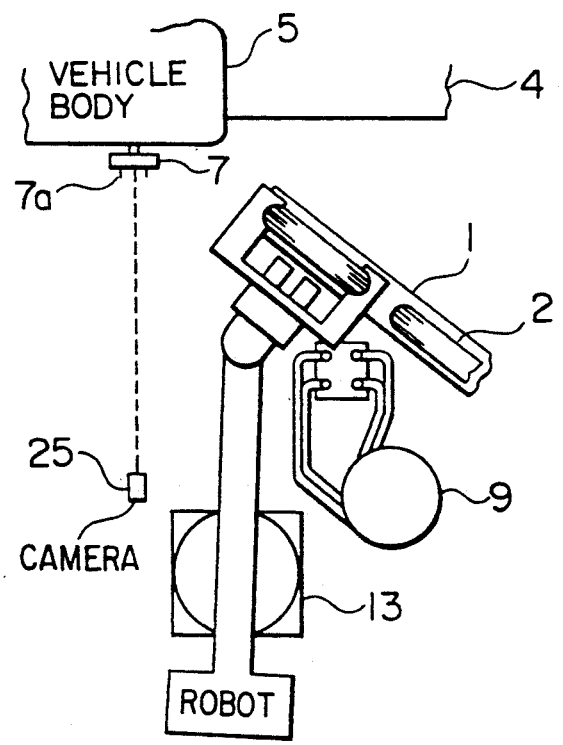
FIG. 4 is a plan view similar to FIG. 2, showing the robot when removing a wheel from a wheel conveyor.

The robot 13 can pivot between a wheel mounting station and a wheel supply station. When the robot 13 is at the wheel mounting station as shown in FIG. 1, the hand 15 of the robot 13 is positioned in the vicinity of one of the brake drums 7 of a vehicle body 5, which is moved along an assembly line by a conveyor 4. The conveyor 4 can be temporarily stopped to position a vehicle body 5 at the mounting station while the robot 13 mounts a wheel on the body 5. When the robot 13 is at the wheel supply station, as shown in FIG. 4, the hand 15 of the robot 13 is located in the vicinity of a wheel conveyor 1 which supplies wheels 2 one by one to the robot 13 for mounting on the vehicle body 5. The wheel conveyor 1 moves wheels 2 to a prescribed pickup position where they can be grasped by the hand 15 of the robot 13. Each time a wheel 2 is removed from the pickup position by the robot 13, the wheel conveyor 1 moves another wheel 2 to this position. A nut supply mechanism 9 is disposed in the vicinity of the wheel conveyor 1 at the wheel supply station. Unillustrated wheel mounting nuts are supplied from a body portion 10 of the nut supply mechanism 9 to the top surface of a base 12 by nut supply conduits 11. The nuts can be removed from the base 12 by the nut runners 16.

Each wheel 2 has a plurality of unillustrated stud holes by means of which the wheel 2 is secured to wheel mounting studs 7a on a suitable wheel mounting portion of a vehicle body 5. In the present embodiment, the wheel mounting portions are brake drums 7. The positions of the stud holes in the wheel 2 at the wheel supply station and the position of the wheel mounting studs 7a on the brake drum 7 at the wheel mounting station are determined by a recognition means in the form of a pivotally mounted video camera 25. The camera 25 is able to move independently of the robot 13. While the robot 13 is performing an operation at one of the stations, the camera 25 is aimed at the other of the two stations. Namely, when the robot 13 is performing a task at the wheel mounting station, the camera 25 is aimed at the wheel 2 wheel pickup position and vice versa.

FIG. 2 shows an example of a control circuit for the embodiment of FIG. 1 The entire apparatus is controlled by a microprocessor 28 including a RAM 29, a CPU 30, and a ROM 31. The microprocessor 28 is connected by an I/O port 27 to a robot controller 22, a peripheral device controller 24, and a camera controller 26. The robot controller 22 controls a robot driver 21 which drives the robot 13. The peripheral device controller 24 controls a peripheral device drive 23, which drives various peripheral devices including the wheel conveyor 1, the nut supply mechanism 9, and the vehicle body conveyor 4. The camera controller 26 controls the video camera 25.

The robot 13 is installed in a location where it can mount a rear wheel on one side of a vehicle body 5. Similar robots 13 can also be installed at other locations so as to simultaneously mount the other wheels on the vehicle body.

Figure 5:
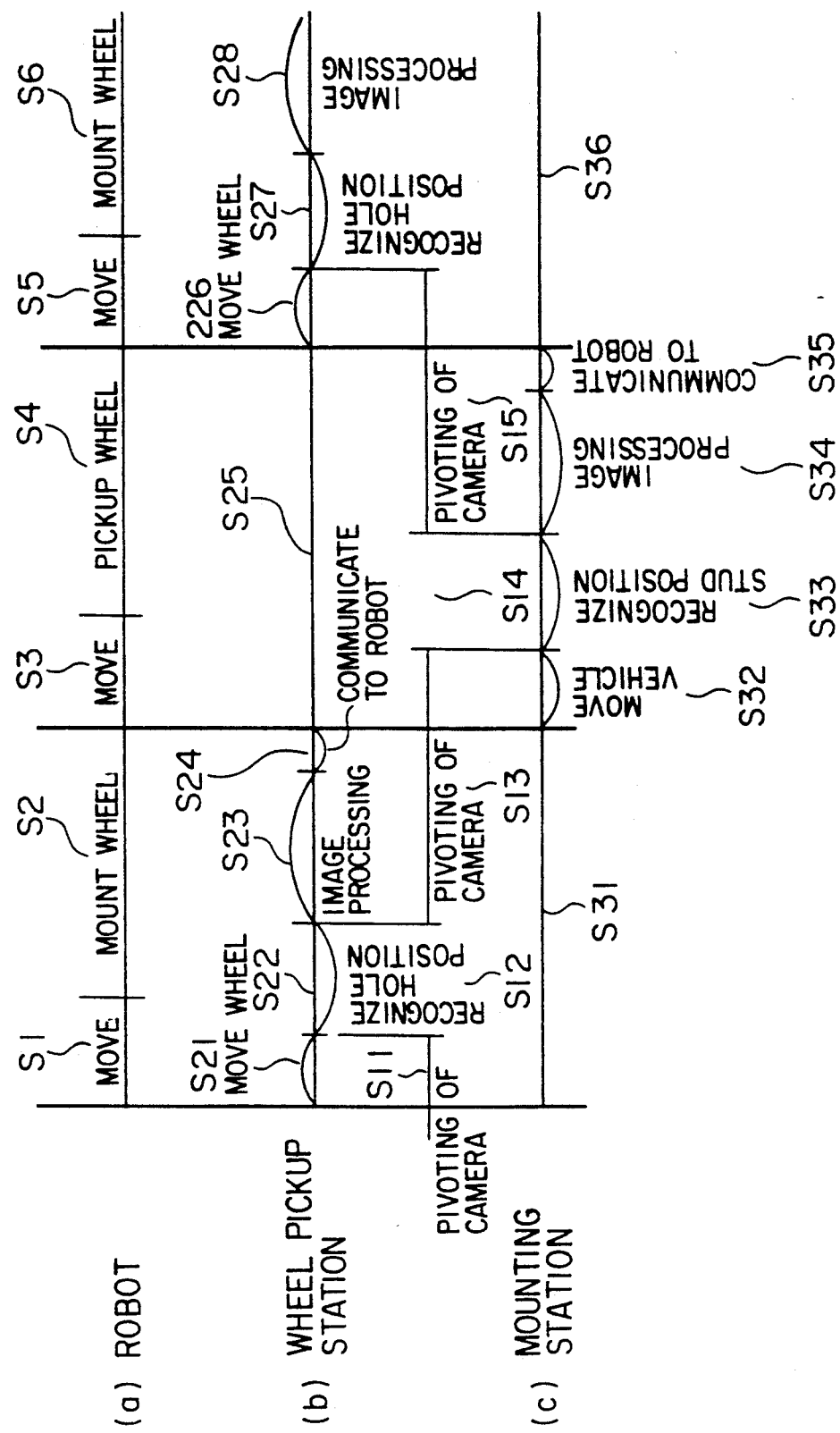
FIG. 5 is a timing diagram of the operation of the embodiment of FIG. 1.

FIG. 5 is a timing diagram of the operation of this embodiment. FIG. 5a shows the timing of the operation of the robot 13, FIG. 5b shows the timing of the operations performed at the wheel supply station, and FIG. 5c shows the timing of the operations performed at the wheel mounting station.

In Step S1 of FIG. 5a, the robot 13, which is grasping a wheel 2, pivots from the wheel supply station to the wheel mounting station. In Step S2, at the wheel mounting station, based on instructions received from the microprocessor 28, the robot driver 21 rotates the hand 15 of the robot 13 until the stud holes of the wheel 2 which is grasped by the hand 15 are aligned with the wheel mounting studs 7a of the brake drum 7. The robot 13 then places the wheel 2 on the drum 7 so that the studs 7a extend through the stud holes. The nut runners 16 then tighten a nut onto each one of the studs 7a and the wheel 2 is mounted on the vehicle body 5. In Step S3, the robot 13 pivots from the wheel mounting station to the wheel supply station. In Step S4, based on instructions from the microprocessor 28, the robot driver 21 rotates the hand 15 of the robot until the nut runners 16 are aligned with the stud holes of the wheel 2 located at the pickup position of the wheel conveyor 1, and the robot hand 15 picks up the wheel 2 from the conveyor 1. In Step S5, the robot 13 moves back to the wheel mounting station, and in Step S6, it mounts the wheel 2 on the vehicle body 5 in the same manner as in Step S2. This series of operations is continuously repeated.

While the robot 13 is moving in Step S1 from the pickup station to the mounting station, in Step S11, the camera 25 is pivoting in the opposite direction from the wheel mounting station until it is aimed at the wheel supply station. At the same time, in Step S21, a wheel 2 is moved by the wheel conveyor 1 to the pickup position. In Step S22, the camera 25 forms an image of the wheel 2 at the pickup position. In Step S23, the microprocessor 28 performs image processing of the image formed in Step S22 in order to determine the orientation of the stud holes in the wheel 2, and in Step S24, positional information concerning the stud hole orientation is transmitted to the robot controller 22. On the basis of this positional information, the robot controller 22 controls the rotation of the robot hand 15 through the robot driver 21 in Step S4 when the robot 13 reaches the wheel pickup position.

As soon as the camera 25 has finished forming an image of the stud holes in the wheel in Step 12, the camera 25 pivots from the wheel pickup position to the wheel mounting position in Step S13. While the camera 25 is pivoting, the microprocessor 28 is performing image processing and communicating positional information to the robot controller 22 in Steps S23 and S24. Furthermore, while the camera 25 is pivoting, in Step S32 the conveyor 4 moves a new vehicle body 5 to a prescribed position where wheels 2 can be mounted on the body 5, and it moves the previous body 5 on which a wheel 2 was just mounted downstream of the robot 13. When the camera 25 is aimed at the brake drum 7 at the wheel mounting station, in Step S33, it forms an image of the wheel mounting studs 7a of the brake drum 7. In Step S34, the microprocessor 28 processes the image formed by the camera 25 in Step S33 to determine the rotational position of the wheel mounting studs 7a of the wheel. In Step S35, positional information concerning the stud orientation is transmitted to the robot controller 22, which on the basis of this information controls the rotation of the robot hand 15 to align the stud holes of the wheel 2 with the studs 7a.

When the camera 25 has finished forming an image of the drake drum 7, in Step S15 it pivots back to the wheel pickup position. At the wheel pickup position, Steps S26–S28, which are identical to Steps S21–S23, are performed. When a wheel 2 is removed from the wheel conveyor 1 by the robot 13, another wheel 2 is moved to the supply position. This series of operations is continuously repeated, and wheels 2 are continuously removed from the wheel conveyor 1 and then mounted on a vehicle body 5.

From FIG. 5, it can be seen that when the robot 13 is performing an operation at one of the two stations, the camera 25 is forming an image of an object at the other station. For example, while the robot 13 is mounting a wheel 2 at the wheel mounting station, the camera 25 is forming an image of a wheel at the wheel supply station. By the time that the robot 13 has performed an operation at one station, the microprocessor 28 has already finished image processing of the image of an object at the next station. Therefore, when the robot 13 pivots to the next station, it can immediately begin to perform an operation. The robot 13 is constantly in movement, and when it is not performing an operation at the supply station or the mounting station, it is moving between the two stations. Thus, unlike a conventional arrangement in which image processing is performed after the robot reaches a station, in the present invention the robot 13 never has to sit idle while waiting for image processing to be performed. As there is no idle time, the operating efficiency of the robot 13 is increased and the speed of assembly can be increased.

As the camera 25 is not mounted on the robot 13, a cable for connecting the camera 25 to the microprocessor 28 can be stationary and therefore is not bent each time the robot 13 moves, so there is less possibility of breakage of the cable.

In the illustrated embodiment, a single pivoting video camera 25 is employed. However, it is instead possible to employ two stationary cameras, one of which is aimed at the wheel mounting station and the other of which is aimed at the wheel supply station.

The robot 13 in the illustrated embodiment moves between only two stations. However, the present invention can be employed in a manufacturing process in which a robot performs operations at three or more different stations in sequence. In this case, while the robot is performing an operation at one station, the camera forms an image of an object at a subsequent station.

Although the illustrated embodiment is an apparatus for mounting wheels on vehicle bodies, the present invention can be used for performing other manufacturing operations, and it is not limited to use in automobile manufacture.

What is claimed is:
1. An assembly apparatus comprising:
a plurality of discrete fixed stations;
a robot which can move to each of the plurality of discrete stations in sequence to perform an operation on an object at each station;
position recognition means for generating a discrete image containing positional information concerning an object at each discrete station;
robot control means responsive to the position recognition means for controlling the robot to perform a discrete operation sequence on an object at each station based on positional information from the recognition means; and
means for controlling the position recognition means to generate an image containing the positional information concerning an object at one of the stations while the robot is performing an operation at a previous station.

2. An assembly apparatus as claimed in claim 1, wherein the robot control means comprises means for moving the robot to a supply station to grasp a first object and to a mounting station to mount the first object on a second object.

3. An assembly apparatus as claimed in claim 2, further comprising supply means for supplying a first object to a supply position at the supply station where the first object can be grasped by the robot.

4. An assembly apparatus as claimed in claim 3, wherein the supply means comprises means for supplying a plurality of first objects one by one to the supply position, further comprising means for controlling the supply means to supply another first object to the supply position when the robot removes a first object from the supply position.

5. An assembly apparatus as claimed in claim 2, wherein the first object comprises an automobile wheel having stud holes formed therein and the second object comprises a vehicle body equipped with a wheel mounting portion having wheel mounting studs on which a wheel can be mounted.

6. An assembly apparatus as claimed in claim 5, wherein the robot includes a nut runner for driving nuts on the wheel mounting studs.

7. An apparatus as claimed in claim 6, further comprising a nut supplier for supplying a nut to the nut runner at the supply station.

8. An assembly apparatus as claimed in claim 5, wherein the position recognition means comprises a camera which can move between a first position in which it is aimed at a wheel at the supply position and a second position in which it is aimed at the wheel mounting studs of a vehicle at the mounting station.

9. An assembly apparatus as claimed in claim 1, wherein the plurality of stations includes a discrete fixed part supply station and discrete fixed part mounting station, and wherein the position recognition means comprises a video camera which is movable between a first position in which it is aimed at a first object at the supply station and a second position in which it is aimed at a second object at the mounting station.

10. An assembly apparatus as claimed in claim 1, wherein the plurality of stations includes a discrete fixed part supply station and a discrete fixed part mounting station, and
wherein the position recognition means comprises a first video camera aimed at a first object at the supply station and comprises a second video camera aimed at a second object at the mounting station.

11. An automobile assembly apparatus comprising:
a part supply station;
a part mounting station;
a conveyor for transporting vehicle bodies in sequence to the part mounting station;
a part supplier for supplying a part to the part supply station;
a robot movable between the part supply station and the part mounting station and equipped with a hand for grasping a part at the supply station and mounting the part on a vehicle body at the mounting station;

image forming means for forming a discrete image of a part at the supply station and for forming another discrete image of a portion of the vehicle body on which the part is to be mounted at the mounting station;

image processing means for processing an image formed by the image forming means to generate positional information;

a controller including robot control means for controlling the position of the robot hand, based on the positional information from the image processing means, through a part supply operation at the supply station and through a part mounting operation at the mounting station, and including means for controlling the image forming means to form an image of a part of the supply station when the robot is performing a mounting operation at the mounting station and to form an image of a vehicle body at the mounting station when the robot is performing a part supply operation at the supply station.

12. A wheel mounting apparatus for mounting a wheel having stud holes on wheel mounting studs of a vehicle body, comprising:

a wheel mounting station;

a wheel supply station having a supply position;

a conveyor for conveying automobile bodies in sequence to the mounting station;

a wheel supplier for sequentially supplying wheels to the supply position at the supply station;

a robot which is movable between the supply station and the mounting station and which is equipped with a movable hand for grasping a wheel and a plurality of nut runners mounted on the hand;

a camera for forming an image of a wheel at the supply position of the supply station and for forming a separate image of the wheel mounting studs of a vehicle body at the mounting station;

an image processor for processing an image formed by the camera to generate positional information;

robot control means responsive to the image processor for controlling the hand of the robot when the robot is at the supply station to align the nut runners with the stud holes in a wheel at the supply position and for controlling the hand of the robot when the robit is at the mounting station to align the stud holes of the wheel which is grasped by the hand with the wheel mounting studs on the vehicle body; and camera control means for controlling the camera to form an image of a wheel at the supply position when the robot is at the mounting station and for forming an image of the wheel mounting studs on a vehicle body at the mounting station when the robot is at the supply station.

13. A robotic assembly method comprising the steps of:

generating positional information concerning the object at a first fixed station;

moving a robot to the first station and controlling the robot to perform an operation on an object at the first station based on the positional information; and generating positional information concerning an object at a discrete second fixed station separate from the first station while the robot is performing an operation at the first station.

14. An assembly method as claimed in claim 13, further comprising moving the robot to the second station and controlling the robot to perform an operation on the object at the second station based on the positional information concerning the object at the second station.

15. An assembly method as claimed in claim 13, wherein the steps of generating positional information each comprise forming an image of an object with a camera and processing the image to generate positional information.

16. An assembly method as claimed in claim 14, wherein:

controlling the robot at the first station comprises controlling a hand of the robot to obtain a prescribed positional relationship between the hand and a first object at the first station and grasping the first object; and controlling the robot at the second station comprises controlling the hand of the robot to obtain a prescribed positional relationship between the first object grasped by the hand and a second object at the second station and mounting the grasped first object on the second object.

17. A robotic assembly method comprising the steps of:

forming a discrete image with a cameral of stud holes of wheel at a discrete first fixed station and generating positional information concerning the stud holes;

moving a robot to the first station after the positional information has been generated at the first station, controlling a hand of the robot to obtain a prescribed positional relationship between the hand and the stud holes based on the positional information, and grasping the wheel;

forming a second discrete image with a cameral of wheel mounting studs on a vehicle body at a discrete second fixed station and generating positional information concerning the wheel mounting studs while the robot is at the first station; and moving the robot to the second station while grasping the wheel, controlling the hand of the robot to obtain a prescribed positional relationship between the stud holes of the wheel and the wheel mounting studs, and mounting the wheel on the wheel mounting studs based on the positional information concerning the wheel mounting studs.

* * * * *

UNITED STATES PATENT AND TRADEMARK OFFICE
CERTIFICATE OF CORRECTION

PATENT NO. : 5,159,745

DATED : November 3, 1992

INVENTOR(S) : Hisao Kato

It is certified that error appears in the above-identified patent and that said Letters Patent is hereby corrected as shown below:

Claim 12, col. 7, line 51, change "robit" to --robot--.

Claim 13, col. 8, line 3, change "the" to --an--.

Signed and Sealed this

Ninth Day of November, 1993

BRUCE LEHMAN

Attest:

*Attesting Officer*

*Commissioner of Patents and Trademarks*